Patented Nov. 17, 1953

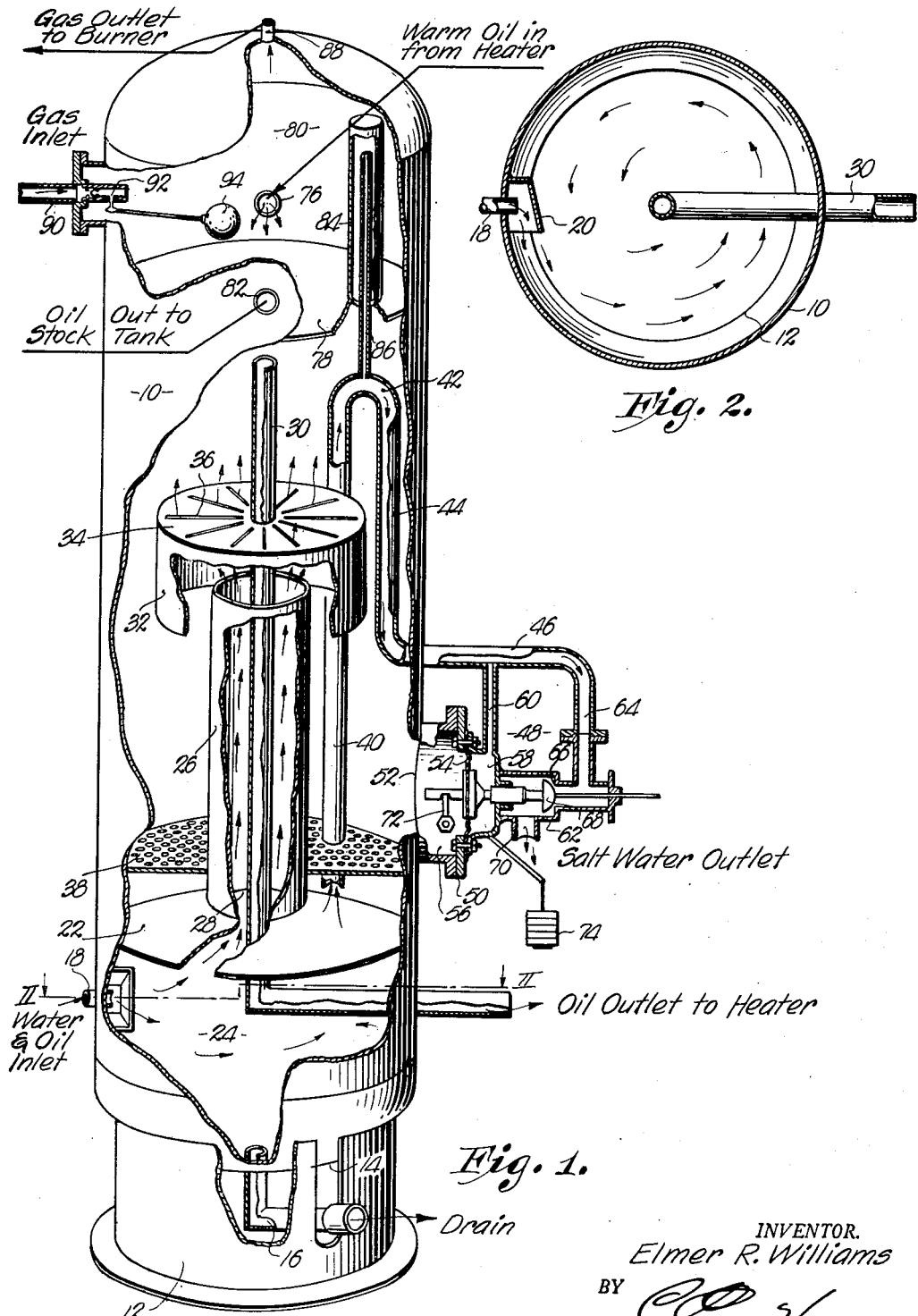

2,659,488

UNITED STATES PATENT OFFICE 2,659,488

STRUCTURE FOR REMOVING FREE WATER FROM PRODUCTS HAVING OIL AND FREE WATER THEREIN

Elmer R. Williams, Springfield, Mo.

Application February 10, 1950, Serial No. 143,479

3 Claims. (Cl. 210—51)

This invention relates to the field of treating and handling petroleum products, particularly to the separation of water therefrom at any time after pumping from natural wells, or usually as the same emanates from the wells.

It is common practice in this field to separate water from petroleum products through the use of settling tanks as well as through heating and agitation of the same either as the products emanate from the well or subsequent thereto, which processes are entirely effective but slow and/or expensive whenever the natural products contain a relatively large amount of water.

Many wells now in production contain valuable products but as pumping occurs, a tremendous amount of water is pumped therewith. If such free water is removed through settling, the process is extremely slow and if the entire output of such wells is put through the heating step to cause water separation, then the expense of handling such products is great and virtually impractical.

It is accordingly the primary object of the present invention to provide means and structure for removing free water from petroleum products quickly and expeditiously at a small cost whenever the output of the well contains a relatively large amount of water whereby such output need not pass through the heating step of the settling process, thereby decreasing the handling costs quite appreciably.

Another important object of the present invention is to provide structure for separating free water from petroleum products taking the form of an upright drum adapted to receive the output of a well and to direct the same toward the top of the drum where the free water will settle from the petroleum within the drum and having means for separately conveying the petroleum and the water respectively from the drum.

Another important object of the present invention is to provide structure of the above mentioned character wherein a specially formed control valve and siphoning system is provided for the water in the drum so disposed with respect to the products in the drum as to maintain a predetermined level of water and to drain excess free water removed from the products for ultimate disposal to waste.

Another object of the present invention is to provide a method and apparatus for removing free water from petroleum products wherein is provided in the aforementioned drum, means to effect a chopping up of the products as the same flow into the drum to enhance and augment separation of water, together with means for receiving the separated water as the same settles in the tank to further filter particles of oil carried downwardly with the water.

A still further object of the present invention is to provide means forming a part of the water separating assembly for receiving the petroleum after heating thereof and capturing gas vapors rising from the heated petroleum for use within the burner forming a part of the heating means, there being mechanism for maintaining a constant supply of fuel to the burner at all times irrespective of the gas content of the petroleum and its rate of flow.

In the drawing:

Fig. 1 is an elevational view of free water knockout apparatus made in accordance with my present invention and illustrating the structure capable of carrying out the method hereof, parts being broken away and in section to reveal details of construction; and Fig. 2 is a transverse cross-sectional view taken on irregular line II—II of Fig. 1.

In brief, the structure employed herein for removing free water from products emanating from oil wells particularly when the water content is relatively large, embodies the following distinct steps:

The base product is first directed into a container therefor in such manner as to channel the products toward the top of the container while subjecting the same to a chopping action and thereby augmenting the water separation.

The oil and water are permitted to separate within the container and as the water settles therewithin, it is subjected to a filtering action for removing such oil particles as might be carried downwardly with the descending water. The petroleum is thereupon drained from the container from a point near the top thereof and the water is simultaneously removed from the drum at its points of settling.

A predetermined amount of water is always maintained within the container to the end that only water finds its way from the container to waste, whereas petroleum alone passes to an ultimate point of discharge through its conveying means.

The structure for carrying out the above briefly outlined method is disclosed in the drawing and includes an elongated, upright, preferably cylindrical drum broadly designated by the numeral 10. Drum 10 is mounted upon a suitable base 12 and is provided with a bottom wall 14 having an outlet pipe 16 that is normally closed but adaptable for draining the drum 10 when and if desired for cleaning and other purposes.

The products to be treated by removal of water therein ordinarily emanate from a natural well under pressure and are directed into the drum 10 near the bottom 14 thereof by means of a conduit 18. The innermost end of the conduit 18 has an overhanging and overlapping baffle plate 20 in spaced relationship thereto mounted upon the innermost wall of the drum 10 in any suitable manner.

Baffle 20 is formed and disposed as illustrated in Figs. 1 and 2 to initiate a swirling movement in the products as the same enter the drum 10, all as indicated by arrows in Figs. 1 and 2.

A horizontal, circular partition 22, rigidly mounted in the drum 10 above the inlet conduit 18, sets off a compartment 24 therebelow constituting the receiving chamber of the drum 10.

An elongated tube 26 preferably coaxial with the drum 10 extends upwardly from the uppermost face of the partition 22 and communicates with an opening 28 in partition 22 thereby presenting a passageway for channeling the products entering compartment 24 toward the top of drum 10 as indicated by arrows in Fig. 1.

A conduit 30 serving as an outlet for petroleum after separation of water therefrom, is disposed for mounting a hood 32 overlying the uppermost end of tube 26. The conduit 30 is L-shaped as illustrated and has its vertical leg extending through the tube 26 and opening 28 in coaxial relationship therewith and its horizontal leg projecting outwardly from compartment 24 through the side of drum 10 opposite to inlet conduit 18.

Hood 32 is provided with a top wall 34 that in turn has a plurality of radial slots 36 through which the original, natural products pass as the same emanate from the uppermost end of tube 26. A swirling, substantially rotative action in such products within drum 32 as initially occurring in chamber 24, causes the water and oil to break-up and thereby separate prior to movement from drum 10. After the chopping action imparted to the products by drum 32 takes place, free water will settle downwardly in drum 10 to the partition 22. Such water must pass through a foraminous partition 38 mounted within the drum 10 in spaced relationship above the partition 22. As the settling water passes through member 38, such oil particles as may be carried downwardly therewith will be filtered and permitted to rise for admixture with the petroleum overflowing into the uppermost end of conduit 30. It is noted that said uppermost end of conduit 30 terminates well above the tube 26 and the hood 32.

Siphoning means for the settled water within the drum 10 includes a vertical pipe 40 having its lowermost end spaced above the partition 22. Pipe 40 extends upwardly through the foraminous member 38 and is rebent upon itself at 42 whereupon the same extends downwardly in a pipe section 44 that extends through the drum 10 at its lowermost end into a horizontal section 46. It is noted that the uppermost end 42 of the pipe sections 40 and 44 are spaced slightly below the uppermost end of conduit 30.

A valve assembly, broadly designated by the numeral 48, is mounted on the outermost face of drum 10 below horizontal pipe section 46 and above a horizontal plane through the foraminous member 38. Valve assembly 48 includes a housing 50 communicating with the interior of drum 10 at 52 and having a diaphragm 54 separating the same into a compartment 56 that communicates with drum 10 and a compartment 58.

A by-pass pipe 60 places the pipe section 46 into direct communication with the compartment 58 of housing 50. A secondary housing section 62 also communicates with the pipe section 46 through vertical pipe 64 and is provided with a valve seat 66 for receiving a reciprocable valve 68 joined with the diaphragm 54.

Housing 62 has an outlet conduit 70 in the bottom thereof. An arm 72 in compartment 56 of housing 50 is operably connected with the valve 68. Any suitable toggle mechanism (not shown) interconnects the arm 72 exteriorly of housing 50 with weights 74. Such toggle mechanism is so arranged to hold the valve 68 biased toward the open position as shown in Fig. 1 through weight 74.

Water emanating from outlet 70 is directed to any suitable waste disposal whereas the petroleum passing from the drum 10 through outlet pipe 30 is directed into a suitable heating means therefor (not shown). After the oil has been heated, it is redirected into the drum 10 by means of conduit 76 near the uppermost end of drum 10 above a partition 78 that overlies and is spaced above the uppermost end of the overflow or outlet conduit 30.

From compartment 80 of tank 10 above partition 78, the oil is directed to suitable stock tanks (not shown) through the medium of an outlet pipe 82. An expansion tube 84 extends upwardly from the partition 78 into the compartment 80 and communicates with that part of the drum 10 below partition 78. A smaller tube 86 extending into the tube 84 communicates at its uppermost end with the arcuate portion 42 of water siphoning pipes 40—44. The uppermost end of tube 84 is closed, whereas the uppermost end of tube 86 is spaced below the uppermost end of tube 84 and is open.

Gas vapors arising from the heated oil as the same enters compartment 80, are directed by means of a pipe 88 communicating with compartment 80 at the top thereof into the burner or heater for the oil above mentioned. Thus, such vapors are utilized as a fuel source for the heater and are not wasted. An auxiliary source of gas vapors for such heater is directed into the compartment 80 through a pipe 90 having a valve 92 therein controlled by a conventional float 94.

Valve 92 and float 94 are so arranged as to cause valve 92 to open whenever float 94 swings downwardly as a result of the lowering of the oil level within compartment 80. Conversely, when the oil level rises in compartment 80, float 94 is carried upwardly therewith and valve 92 is closed.

While the operation of the apparatus above described has been partially set forth hereinabove, analyzation of such operation is as follows:

The petroleum products to be treated whether emanating directly from a well or otherwise are directed usually under pressure into the compartment 24 of drum 10 by means of conduit 18. An initial swirling action is imparted to the products as the same enter the compartment 24 because of the baffle 20 and such action continues as the products rise in the tube 26 and impinge upon the top wall 34 of hood 32. As such swirling and spirally moving products pass through the slots 36 in wall 34, the same are chopped up into smaller particles which augments the separation of free water therefrom. Obviously, after the level of liquid within the drum 10 reaches a point adjacent the uppermost end of outlet conduit 30, all oil that passes through slots 36 will continue to rise and overflow into conduit 30 for ultimate discharge into a heater therefor. Water on the other hand, being heavier, will settle not only from the uppermost end of tube 26 but from the hood 32 after passing through slots 36. Such water will be carried downwardly through the foraminous member 38 and such particles of oil as are carried therewith will be filtered therefrom for subsequent rising and discharge into conduit 30. Gases rising from the level of the oil in drum 10 will collect below the partition 78 and also extend into the tubes 84 and 86. These gases will, after separation from the products, be in turn carried with the oil downwardly into overflow outlet pipe 30. However, a constant pressure on the uppermost level of liquid in drum 10 will be present.

Water settling from the products and occurring adjacent the uppermost face of partition 22 will find its exit from drum 10 by means of conduits 40—44. The uppermost end of such siphoning means at curved portion 42 being slightly lower than the uppermost end of outlet conduit 30, assures the outward passage of such water downwardly through pipe section 44 and horizontal pipe section 46. Gases, as aforesaid, existing within the pipes 84 and 86 will cause a pressure to be exerted upon the water at the curved portion 42 of the siphoning means. Thus, the outflow of water from the drum 10 is dependent upon the extent of gas pressure exerted thereupon at the curved portion 42 through tube 86. When the pressure is relieved below a predetermined point, such water will flow freely outwardly into the housing section 62 whenever the valve 68 is in the open condition shown in Fig. 1 of the drawing. It is to be noted however, that the operation of valve 68 is dependent upon a number of factors.

First, valve 68 is held biased toward the closed condition with respect to seat 66 by the internal pressure or head of the liquid within the drum 10 since such liquid is in direct communication with diaphragm 54 through compartment 56 of housing 50 that communicates with the drum 10. A counter-pressure or action upon the diaphragm 54 exists by the weight of water in pipe sections 44, 46 and 60, the latter communicating directly with section 58 of housing 50 on the opposite side of diaphragm 54.

Third, the weight 74 tends to hold the valve 68 biased toward the open position. Consequently, whenever the level of liquid within drum 10 is relatively high above the uppermost end of outlet conduit 30, the weight of such liquid acting upon the diaphragm 54 will hold the valve 68 in the closed position overcoming the action of weight 74 and the head of water within the compartment 58 of housing 50 as well as the head of water in pipe section 64 acting on valve 68.

However, as soon as such level of liquid in drum 10 lowers to a predetermined level, the action of weight 74, the head of water in compartment 58 and in pipe section 64, will overcome the pressure exerted upon the diaphragm 54 within housing compartment 56 and valve 68 will open to permit outflow of water through housing 62 and outlet 70. Such outflow of water of course, is still dependent upon the pressure of gases within tube 86 and at the uppermost end 42 of the water siphoning system.

Such changes in the level of liquid in drum 10 below partition 78 also directly determines the rate of flow of heated oil into compartment 80 of drum 10 through inlet 76. As such flow increases or decreases, the amount of gases emanating from compartment 80 and passing to the heater by way of outlet conduit 88 will accordingly vary. Since it is necessary to furnish such heater with a constant flow of fuel, more or less additional gas vapors are introduced into the compartment 80 through the pipe 90 from a suitable source not shown, dependent upon the action of valve 92 through its float 94.

It is seen from the foregoing that a simple, inexpensive and rapid means of removing free water from petroleum products has been provided. The entire apparatus and method is particularly adaptable for use whenever such products contain a relatively large amount of free water. By removing such free water prior to introduction of the products into a heater, the expense of heating the entire output of the well is appreciably decreased.

Through use of the siphoning means above described, there is always an assurance that only petroleum free of water passes into the heater, whereas all of the water that has been separated from the products, will find its way from the drum 10 by way of outlet 70. The siphoning means is dependent entirely upon the amount of water that exists in the products and as more or less is removed therefrom, the valve assembly 48 will operate to maintain a constant level of water in the drum 10. The weight or head of liquid in drum 10 is utilized directly to control the siphoning means and the gases emanating from the products are also utilized to control such siphoning means. The gases are not wasted since the same move into the heater with the petroleum by way of outlet 30 and as such gases are returned to the drum 10 by way of inlet conduit 76, they are again saved and utilized as fuel for the heater.

It is significant also that there has been provided not only means to utilize the escaping gases, but structure for assuring that the heater is always provided with a constant flow of necessary fuel.

Having thus described the invention, what is claimed as new and desired to be secured by Letters Patent is:

1. A structure for removing free water from products having oil and free water therein, said structure comprising a settling tank; an upright, open top tube in the tank for conveying the products into the tank; means for whirling the products as the same rise in the tube; an inverted hood above the open top of the tube within the path of travel of products rising from the open top of the tube, said hood having a top wall provided with a number of slots disposed to receive the products as the same flow into the hood and wash against the top wall, said slots radiating from an axis aligned with the vertical axis of the tube; apparatus for removing free water from the tank as the same settles therein; and means separate from said apparatus for removing from the tank the residue of said products remaining after removal of said water therefrom.

2. A structure for removing free water from products having oil and free water therein, said structure comprising a settling tank; an upright tube in the tank for conveying the products into the tank; an inverted hood above the tube within the path of travel of products emanating from the tube, said hood having a top wall provided with a number of slots disposed to receive the products as the same flow into the hood and wash against the top wall; apparatus for removing free water from the tank as the same settles therein; and means including a vertical conduit within the tube and terminating in an open end above the hood for removing from the tank the residue of said products remaining after removal of said water therefrom.

3. A structure for removing free water from products having oil and free water therein, said structure comprising a settling tank; an upright tube in the tank for conveying the products into the tank; an inverted hood above the tube within the path of travel of products emanating from the tube, said hood having a top wall provided with a number of slots disposed to receive the products as the same flow into the hood and wash against the top wall; apparatus for removing free water from the tank as the same settles therein; and means including a vertical conduit within the tube and terminating in an open end above the hood for removing from the tank the residue of said products remaining after removal of said water therefrom, said conduit extending through said top wall and being secured thereto for adapting the conduit as the support for said hood.

ELMER R. WILLIAMS.

References Cited in the file of this patent

UNITED STATES PATENTS

| Number | Name | Date |
| --- | --- | --- |
| Re. 19,666 | McMurray | Aug. 13, 1935 |
| 306,837 | Klein | Oct. 1, 1884 |
| 1,946,229 | McMurray | Feb. 6, 1934 |
| 2,016,642 | Lincoln | Oct. 8, 1935 |
| 2,122,310 | Burt | June 28, 1938 |
| 2,167,160 | Raymond | July 25, 1939 |
| 2,179,131 | Millard | Nov. 7, 1939 |
| 2,181,685 | Walker | Nov. 28, 1939 |
| 2,224,624 | Adams et al. | Dec. 10, 1940 |
| 2,342,950 | Lovelady et al. | Feb. 29, 1944 |
| 2,348,167 | Erwin | May 2, 1944 |